United States Patent [19]

Inoue et al.

[11] Patent Number: 4,514,574

[45] Date of Patent: Apr. 30, 1985

[54] PROCESS FOR SEPARATING ISOMERIC MIXTURES

[75] Inventors: Kimio Inoue; Gale G. Hoyer; Stanley I. Bates, all of Midland, Mich.

[73] Assignee: The Dow Chemical Company, Midland, Mich.

[21] Appl. No.: 569,083

[22] Filed: Jan. 9, 1984

[51] Int. Cl.³ .................. C07C 85/26; B01D 3/34
[52] U.S. Cl. .................................. 564/424; 203/49; 260/705; 564/428; 564/430; 564/437; 564/439; 568/724; 568/750; 568/751; 568/752; 568/723
[58] Field of Search ............ 564/439, 424, 437, 428, 564/430; 203/49; 568/724, 750, 751, 752, 723; 260/705

[56] References Cited

U.S. PATENT DOCUMENTS

| | | | |
|---|---|---|---|
| 3,413,350 | 11/1968 | Cross et al. | 564/424 |
| 3,969,196 | 7/1976 | Zosel | 203/49 |
| 4,028,220 | 6/1977 | Urquhart | 208/8 |
| 4,108,760 | 8/1978 | Williams et al. | 208/11 LE |
| 4,153,063 | 5/1979 | Roselius et al. | 131/143 |
| 4,247,570 | 1/1981 | Zosel | 426/481 |
| 4,251,559 | 2/1981 | Margolis et al. | 426/490 |
| 4,345,976 | 8/1982 | Peter et al. | 203/49 |
| 4,349,415 | 9/1982 | DeFilippi et al. | 203/14 |

FOREIGN PATENT DOCUMENTS 1144343   4/1983   Canada .................. 203/49

OTHER PUBLICATIONS

*Chemical Engineering Progress*, p. 158, (Feb. 1983).
Peter & Brunner, "The Separation of Nonvolatile Substances by Means of Compressed Gases in Countercurrent Processes", pp. 141–154.
Graph, "Solubility of Polyhydric Phenols in Supercritical $CO_2$, 4000 PSI, 55° C.

*Primary Examiner*—Charles F. Warren
*Assistant Examiner*—Harry B. Shubin
*Attorney, Agent, or Firm*—Paul D. Hayhurst

[57] ABSTRACT

Separate isomers via supercritical gas extraction.

17 Claims, No Drawings

PROCESS FOR SEPARATING ISOMERIC MIXTURES

BACKGROUND OF THE INVENTION

This invention relates to a process for the separation of components from mixtures of substances. More particularly, it relates to a process for separating isomeric mixtures.

As industrial chemistry progresses, the demand for purer chemical compounds increases. Distillation and solvent extraction are the two most important processes for the separation of mixtures of substances. Unfortunately, many mixtures of chemical compounds, especially isomeric mixtures, can be separated into the component compounds only with great difficulty and expense or not at all using distillation or solvent extraction.

Distillation has the known disadvantage that the mixtures to be separated must be heated at temperatures which are inversely proportional to the vapor pressure of the substances to be separated. Limits may be set to distillation where the substances to be separated are no longer thermally stable. Use of vacuum widens the field of application of this separation process, but only by an additional boiling interval of about 100° C. to 150° C. The problem is compounded because many isomers have very similar boiling points. Thus, mixtures of isomers are often difficult to separate by distillation. For example, 4,4'-isopropylidenediphenol boils at 195° C. at a pressure of one mm Hg, and 2,4'-isopropylidenediphenol boils at 180° C. at a pressure of one mm Hg. Thus, vacuum distillation at a high temperature and an extremely low pressure could possibly be employed to separate these two isomers, but it is an expensive process, and the required high temperatures promote thermal degradation of the isomeric compounds.

The well-known solvent extraction process is only of limited applicability because the selection of suitable solvents frequently offers great difficulties or because suitable solvents do not exist at all. On the other hand, limits are placed on this process in cases where the solubility characteristics of the components of the mixture to be separated are so similar that efficient separation is no longer obtained. Thus, solvent extraction is not well suited for the separation of many isomers due to the similarity of the isomeric molecules and their characteristics.

Extraction using gases under supercritical conditions has been used to separate many diverse substances. For example, U.S. Pat. Nos. 4,247,570 and 4,251,559 describe the use of supercritical gas extractants in the decaffeination of coffee. Additionally, supercritical gas extraction has been used to remove nicotine from tobacco (U.S. Pat. No. 4,153,063), to treat hydrocarbons, including coal (U.S. Pat. No. 4,028,220) and tar sands (U.S. Pat. No. 4,108,760), and to separate isotopes of chlorine (G. Brit. No. 1,907,924). U.S. Pat. No. 3,969,196 discloses a method of separation which employs a supercritical gas extractant. Said method is limited to a temperature range in which the quantity of organic compound taken up by the gas phase varies inversely with the temperature. U.S. Pat. No. 4,345,976 discloses a process for separating substances of low volatility. Said process is limited in that it requires an entrainer in addition to the supercritical gas. The methods described in the patents cited hereinabove typically operate with separation factors or selectivities of up to about 10.

In view of the deficiencies of the prior art, it would be desirable to have a supercritical gas extraction process for the separation of isomers which did not require an entrainer, and which would be an improved method for separating isomers from isomeric mixtures which are otherwise difficult to separate.

SUMMARY OF THE INVENTION

The process of the present invention is such a process for separating a mixture of isomers of organic compounds comprising:

(a) contacting the mixture with a compressed gas under supercritical conditions such that the gas selectivity takes up at least one isomer;

(b) separating the gas, including any of the mixture taken up by the gas in step (a), from the mixture not taken up by the gas in step (a); and (c) separating at least part of the mixture taken up by the gas from the gas.

Surprisingly, the process of the present invention can be used to separate mixtures of isomers which are otherwise difficult to separate. Advantageously, no entrainer is required, and the process operates over a wide range of conditions. Unexpectedly large selectivities can be achieved when using the instant process.

DETAILED DESCRIPTION OF THE INVENTION

For the purposes of the present invention, the term "selectivity" is defined by the equation:

$$\text{separation factor} = \text{selectivity} = \beta = \alpha_1/\alpha_2,$$

$$\text{wherein } \alpha_x = \left( \frac{\text{concentration of unwanted isomer(s)}}{\text{concentration of desired isomer}} \right);$$

wherein subscript $x=1$ refers to $\alpha_x$ measured in the supercritical phase after it leaves the extraction cell, and subscript $x=2$ refers to $\alpha_x$ measured in purified material remaining in the extraction cell.

Surprisingly high selectivities can be obtained using the process of the present invention. Preferably, the selectivity is at least about 10, although selectivities of much greater magnitudes can be achieved. More preferably, the selectivity is at least about 20. Most preferably, the selectivity is at least about 50.

The process of the present invention basically involves a loading step, a removal step, and a release step. The loading step involves contacting the isomeric mixture with a gas under supercritical conditions such that the gas selectively extracts at least one isomer. For the purposes of the present invention, a preferred process is selective if the selectivity, measured as an average over the total process time, is at least about 10. The removal step involves removing the gas, including any dissolved, dispersed or entrained isomers, from the mixture after the gas passes through the mixture. The release step involves separating the gas from all or part of the isomers which were taken up by the gas.

For the purposes of the present invention, the isomers which may be separated include isomers of compounds which bear at least one organic moiety. Advantageously, the process is employed in the separation of isomeric mixtures having relatively low volatility. Preferably, the isomers to be separated are organic compounds having at least two aromatic rings. More preferred isomers may be represented generally by formula I:

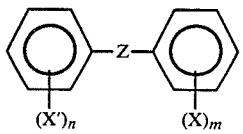

wherein n and m are independently selected from integers of from zero to five inclusive, with the proviso that the quantity (m+n) is greater than zero; Z, which is optional, is S, O, S=O, O=S=O, or a divalent hydrocarbon moiety such as alkylidene, alkenylidene, alkenediyl, arylene, or a moiety which includes at least one fused aromatic ring; and X' and X are independently selected from the group R, —OR, —NRR', halo, —NO$_2$, —SO$_3$R and —COOR, wherein R and R' are independently alkyl, H, aryl or aralkyl. Preferably, Z is C$_1$-C$_3$ alkylidene, X and X' are —OH or —NH$_2$, and n=m=1. Examples of preferred isomeric mixtures include mixtures comprising 2,4'- and 4,4'-isopropylidenediphenol and mixtures comprising 2,2'-, 2,4'- and 4,4'-methylenedianiline. The isomers may be in the solid or liquid phase or both. Solid isomers preferably are finely ground or otherwise treated prior to being treated by the process of the present invention so as to give them a high ratio of surface area to mass.

The critical temperature of a gas is well-known to physical chemists as the temperature above which the gas cannot be liquefied regardless of the pressure to which it is subjected. The pressure necessary to liquefy the gas at its critical temperature is the critical pressure. The process of the present invention typically employs as an extractant a gas or gas mixture at a temperature above the critical temperature and at a pressure at or above the critical pressure, i.e., the gas is in a supercritical condition. For the purposes of the present invention, the term "supercritical condition(s)" includes those conditions which are "near-supercritical", i.e., those conditions of temperature and pressure which approach the supercritical state. Typically, near-supercritical conditions include reduced temperatures, T$_r$, which are greater than about 0.9 and reduced pressures, P$_r$, which are greater than about 0.5. "Reduced pressure", or P$_r$, is defined as the ratio of the process pressure to the critical pressure of the gas being employed, i.e., P$_r$=P/P$_c$, wherein P$_c$ is the critical pressure of the gas employed, and P is the process pressure. Similarly, "reduced temperature", or T$_r$, is defined as T$_r$=T/T$_c$, wherein T is the process temperature and T$_c$ is the critical temperature of the gas employed.

A variety of gases and gas mixtures may be used as the gas which is under supercritical conditions and which serves as an extraction agent. Several guides should be used in the selection of an appropriate gas. Advantageously, the critical temperature of the gas is lower than the temperature at which the separation is to be carried out. The critical temperature for the gas should not be so high that heating the material extracted to above the critical temperature will cause undesirable effects, such as decomposition. Preferably, the critical temperature of the gas extraction agent is below the melting point of the isomer having the highest melting point. The critical temperature must also not be so low that cooling to subcritical conditions is difficult for standard industrial equipment. For these reasons, the critical temperature of the gas chosen will generally be between about 10° C. and about 300° C. Gases having a relatively low critical pressure (e.g., about 30–50 atmospheres; this groups includes, e.g., hydrocarbons, halogenated hydrocarbons, alkylamines, ether, etc.) are preferred, generally speaking, to gases having higher critical pressures (about 50 atmospheres). In special cases, however, e.g., on grounds of safety or because of a particular specific interaction between the gas present in a supercritical state and the substance(s) to be separated, gases having a high critical pressure may also be used as the supercritical agent. The gas should not be reactive with any of the materials to be separated.

The extraction temperature is limited by the requirement that the substances to be separated must not be exposed to any thermal decomposition in the course of the process. With most complex organic compounds, because of their sensitivity, the upper temperature limit is in the range of from 120° C. to 180° C. With compounds which are not very sensitive to temperature, such as hydrocarbons, working temperatures up to 400° C. may be employed. In these cases, compounds such as toluene (critical temperature=320.6° C.), water and ammonia may be used as the supercritical compressed gas. Some typical gases suitable for extractions, along with their critical temperatures and pressures are as follows:

| Gas | T$_c$ (°C.) | P$_c$ (atm) |
| --- | --- | --- |
| Carbon dioxide | 31.0 | 72.9 |
| Ethane | 32.2 | 48.2 |
| Propane | 96.7 | 42.0 |
| CHF$_3$ | 25.9 | 46.9 |
| N$_2$O | 36.5 | 71.7 |
| CClF$_3$ | 28.9 | 38.2 |
| C$_2$H$_2$F$_2$ | 30.1 | 43.8 |
| CHClF$_2$ | 96.0 | 48.5 |
| Ethene | 9.9 | 51.2 |
| Propene | 91.9 | 45.4 |

For additional examples of gases which may be used in supercritical gas extraction processes, see U.S. Pat. No. 4,345,976, the teachings of which, with respect to the gases which may be used in supercritical gas extraction processes, are incorporated herein by reference.

Generally, it is preferred to operate the process of the present invention without an entrainer. However, if desired, a suitable entrainer can be employed to improve the absorbability and selectivity of the gaseous extraction agent with respect to certain materials. The entrainer need not be under supercritical conditions. Water and benzene are examples of typical entrainers.

In the present process, the material to be extracted is contained in an apparatus suitable for withstanding high temperature and pressure, such as an autoclave. In the loading step, gas under supercritical conditions is supplied to an extraction vessel and is allowed to thoroughly contact the material to be extracted. Preferably, the gas will be supplied and removed continuously. Preferably, the loading step is conducted at a temperature which is below the melting point of the isomer having the highest melting point, i.e., it is preferred that at least one isomer be a solid. Most preferably, the isomer having the highest melting point is present in the highest concentration in the isomeric mixture which is to be separated or purified. The reduced pressure, P$_r$, in the extraction vessel during the loading step preferably is from about 0.8 to about 5.

In the removal step, at least part of the supercritical gas phase which had been contacted with the isomeric mixture is removed, typically while remaining under supercritical conditions, from the extraction vessel. The removed gas phase is the feed stream for the release step.

In the release step, the gas removed from the extraction vessel is brought to a new thermodynamic state, usually by changing temperature or pressure or both. The gas in its new state partially or completely loses its capacity to absorb the extracted components, which will separate from the gas and are recoverable. The gas can then be recycled to the extraction vessel. Preferably, the solute is separated from the supercritical gas solvent by reducing the system pressure. For reasons of cost, energy conservation, and convenience, it is preferred to keep the change in pressure as small as possible while obtaining the separation of solvent and solute. More preferably, the solute is separated from the supercritical solvent by changing the temperature of the system. The temperature change can be an increase or a decrease in temperature, depending upon the operating conditions in the extraction cell. Typically, the temperature is decreased to achieve separation. The decision to achieve the separation by raising or lowering the temperature is guided by the knowledge that separation is achieved by decreasing the solubility of the solute isomer(s) in the supercritical gas. The solubility is a function of the density of the supercritical gas solvent, and is a function of the vapor pressure of the solute at a given set of conditions. Generally speaking, separation is achieved at lower pressures by a temperature increase, while at higher pressures it is achieved by a temperature decrease. For any given set of operating conditions, the separation conditions can be easily determined by experimentation. Additionally, separation of the solute from the supercritical gas solvent can be accomplished using known separation techniques such as adsorption, absorption, distillation, crystallization, and the like.

The solubility of a solute in a supercritical fluid is dependent on solute/solvent interactions. These interactions determine the solvent power of the supercritical fluid for the particular solute. They are dependent on the nature of the solute and solvent and on the density of the supercritical solvent. In general, as the density of the supercritical solvent increases at constant temperature, its solvent power and solute solubility increase. Solubility is also dependent on solute vapor pressure. The higher the vapor pressure the higher the solubility of the solute in the supercritical fluid. Increasing temperature increases solute vapor pressure and at the same time decreases the supercritical solvent density. These are competing effects and because of this the dependence of solute solubility on temperature is somewhat complex. Solute solubility may increase, decrease, or remain relatively constant with increasing temperature. The effect of temperature changes depends on whether solvent density or solute vapor pressure is dominant. At high pressures solvent density is relatively independent of temperature and in general solute vapor pressure dominates and solubility increases with increasing temperature. At pressures near the critical pressure solvent density is relatively sensitive to temperature and in general solvent density dominates and solubility decreases with increasing temperature. At intermediate pressures the two effects may balance and solubility remain relatively constant with increasing temperature.

For two solutes that are isomers of each other the solute/solvent interactions are very similar and any selective solubility of one isomer over the other is determined by any differences in vapor pressures. For example, the vapor pressures of the (4,4') and (2,4') isopropylidenediphenol isomers at 180° C. are 0.43 and 0.91 mm Hg respectively. The ratio of the two vapor pressures is 2.1 indicating some preference for the (2,4') isomer to dissolve in the supercritical fluid over the (4,4') isomer. As temperature is reduced, the vapor pressure ratio increases. The ratio increases especially rapidly with decreasing temperature between the freezing points of the two isomers. At 110° C., the vapor pressure for (4,4') and (2,4') isopropylidenediphenol are respectively 0.0010 and 0.0084 mm Hg and the ratio is 8.4. A vapor pressure ratio of 8.4 indicates a strong preference for the (2,4') isomer to dissolve in the supercritical fluid over the (4,4') isomer. Below the freezing point of the (2,4') isomer the vapor pressure ratio continues to increase with decreasing temperature. At 90° C., the vapor pressure for (4,4') and (2,4') isopropylidenediphenol are respectively 0.000095 and 0.00090 mm Hg and the ratio is 9.5.

Vapor pressure ratios of 8.4 and 9.5 suggest the possibility of very selectively separating the (2,4') isomer away from the (4,4') isomer. The relatively large difference in vapor pressures suggests separation by means of distillation. However, the two isomers are essentially nonvolatile because both begin to degrade at significant rates at temperatures at which their vapor pressures are too low even for vacuum distillation to be practical. At 180° C. both isomers degrade rapidly while both vapor pressures are less than 1 mm Hg. The nonvolatility problem is overcome by using a solvent in its supercritical state. Solubility of the two isomers in a conventional liquid solvent is significantly less selective than their solubility in a supercritical solvent because solute/solvent interactions overwhelmingly dominate all other factors with a liquid solvent. Although solvent power of conventional liquid solvents can be high, they do not take full advantage of differences in vapor pressure as supercritical solvents can.

Solubility in the supercritical solvent depends on both solute vapor pressure and solute/solvent interactions or solvent power. The molecular interactions increase the solubility of the solute in the supercritical fluid above what is expected on the basis of solute vapor pressure alone. In many cases, the observed partial pressure of the solute in the supercritical solvent is enhanced up to about a million times greater than the solute vapor pressure. This enhanced solubility is selective because although the solute/solvent interactions and enhancement factors for the two isomers are approximately identical, a large difference exists in vapor pressures.

Accordingly, it is preferred to operate the process of the present invention at conditions under which the ratio of the vapor pressures of the isomers to be separated is at least about 1.1, and it is more preferred to operate under conditions at which the ratio of the vapor pressures is at least about 2.

A particular material will be subjected to the extraction process for a period of time which may be minutes or hours. The material may be supplied to an extraction vessel continuously or it may be supplied in batches. After the extraction period, the material is removed from the autoclave and separated from any absorbed gas which can then be returned to circulation. The particularly desired isomer may be contained in this raffinate phase, or in the gas phase, depending on the properties of the isomers which are being extracted.

As with other methods of separation, a plurality of extraction systems may be set up in a series to further enrich the desired isomer in the raffinate or in the extract. In that case, the starting material for the second and subsequent extraction stages will be either the material recovered from the gas phase of the previous extraction or the material recovered from the raffinate phase of the previous extraction or both.

SPECIFIC EMBODIMENTS

The following examples are given to illustrate the invention and should not be construed as limiting its scope. All parts and percentages are by weight unless otherwise indicated.

GENERAL PROCEDURE

A mixture of isomers in crushed, solid form is placed in an extraction cell consisting of a short section of type 316 stainless steel tube having an inside diameter of approximately 0.6-0.7 inch. A neat supercritical gas is passed into the cell. The effluent stream contains the gas plus some dissolved isomers. The effluent stream is expanded to ambient pressure, and the expansion causes the dissolved isomers to condense out of the gas. The condensed isomers are separated from the gas and are collected for analysis. The gas passes on to a gas meter to determine the volume of gas used in the extraction.

This general procedure is followed in the following examples, with exceptions being noted.

EXAMPLE 1

A 13.877 g mixture containing 13.264 g and 0.613 g, respectively, of 4,4'- and 2,4'-isopropylidenediphenol is extracted with supercritical $CO_2$. The extraction is done at a constant temperature of 41° C. and sequentially at 4 different pressures. At each pressure, 20.7 g of $CO_2$ is passed slowly, at a rate of approximately 0.032 g $CO_2$/g initial isomer mixture/min, through the isomer mixture. The selectivities and isomer loadings in supercritical $CO_2$ obtained are reported in Table I.

TABLE I

| Pressure | Isomer loadings (mg isomer/g $CO_2$) | | Selectivity |
|---|---|---|---|
| (psig) | 4,4'- | 2,4'- | |
| 1500 | .0078 | .363 | 1019 |
| 2510 | .0776 | 1.55 | 462 |
| 3480 | .131 | 2.17 | 416 |
| 4440 | .199 | 2.39 | 332 |

The selectivities for removing the 2,4'-isomer from the desired 4,4'-isomer are approximately 45 to 100 times greater than any previously known selectivity achieved using a supercritical extraction process.

The selectivity is calculated according to the formula given hereinabove: $\beta = \alpha_1/\alpha_2$. For Example 1 at 1500 psig $\alpha_1$ is calculated as follows:

$$\alpha_1 = \text{(loading of 2,4'-isomer/loading of 4,4'-isomer)}$$
$$= 0.363/0.0078$$
$$= 46.5 = \alpha \text{ for the supercritical phase.}$$

For Example 1 at 1500 psig $\alpha_2$ is calculated as follows:

$$\alpha_2 = (2,4'\text{-isomer remaining in cell}/4,4'\text{-isomer remaining in cell});$$

the amounts remaining in the cell are obtained using material balance calculations.

Total 2,4'-isomer removed =

$$\left(\frac{0.363 \text{ mg } 2,4'}{\text{g } CO_2}\right)\left(\frac{20.7 \text{ g } CO_2}{}\right) = 7.5 \text{ mg} = 0.0075 \text{ g}$$

$0.613 - 0.0075 = 0.6055$ g 2,4'-isomer remaining in the cell.

Similarly, 4,4'-isomer removed is $$\left(\frac{0.0078 \text{ mg } 4,4'\text{-isomer}}{\text{g } CO_2}\right)\left(\frac{20.7 \text{ g } CO_2}{}\right) =$$

$$0.16 \text{ mg} = 0.00016 \text{ g}$$

$13.264$ g $- 0.00016 \simeq 13.2638$ g 4,4'-isomer remaining in the cell.

Thus, $\alpha_2 = 0.6055/13.2638 = 0.04565$; and $$\alpha_1/\alpha_2 = \beta = 46.5/0.04565 = 1019.$$

EXAMPLE 2

A mixture containing 11.053 g and 0.511 g, respectively, of 4,4'- and 2,4'-isopropylidenediphenol is extracted with supercritical $CO_2$. The extraction is done at a constant temperature of 132° C. and sequentially at 7 different pressures. At each pressure, 20.7 g of $CO_2$ is passed slowly, at a rate of approximately 0.060 g $CO_2$/g initial isomer mixture/min, through the isomer mixture. The following isomer loadings and selectivities are obtained.

TABLE II

| Pressure | Isomer loadings (mg isomer/g $CO_2$) | | Selectivity |
|---|---|---|---|
| (psig) | 4,4'- | 2,4'- | |
| 1550 | 0.0037 | 0.036 | 211 |
| 2000 | 0.042 | 0.170 | 88 |
| 2490 | 0.132 | 0.199 | 33 |
| 2990 | 0.469 | 0.435 | 21 |
| 3510 | 1.02 | 0.749 | 17 |
| 4060 | 1.80 | 1.18 | 16 |
| 4550 | 2.66 | 1.41 | 14 |

The selectivities are lower than those of Example 1, probably due to the increased process temperature. However, they are still surprisingly high.

EXAMPLE 3

A mixture containing 12.699 g and 0.587 g, respectively, of 4,4'- and 2,4'-isopropylidenediphenol is extracted with supercritical $CO_2$ at a constant temperature of 41° C. and a constant pressure of 3600 psig. The $CO_2$ flow rate is approximately 0.053 g $CO_2$/g initial isomer mixture/min. The following loadings and selectivities are obtained for the first 3 aliquots of $CO_2$.

TABLE III

| Aliquot Number | g $CO_2$ | Isomer loadings (mg isomer/g $CO_2$) | | Selectivity |
|---|---|---|---|---|
| | | 4,4'- | 2,4'- | |
| 1 | 20.7 | 0.112 | 1.84 | 380 |

TABLE III-continued

| Aliquot Number | g $CO_2$ | Isomer loadings (mg isomer/g $CO_2$) 4,4'- | 2,4'- | Selectivity |
|---|---|---|---|---|
| 2 | 31.1 | 0.154 | 2.02 | 343 |
| 3 | 31.1 | 0.124 | 1.02 | 230 |

After passing 353 g of $CO_2$ through the isomer mixture, a total of 0.048 g and 0.226 g, respectively, of 4,4'- and 2,4'-isomers are extracted by the $CO_2$. Thus, the initial mixture containing 95.6 percent 4,4'-isomer is separated into an extract containing 17.5 percent 4,4'-isomer and a raffinate containing 97.2 percent 4,4'-isomer.

EXAMPLE 4

A mixture containing 12.191 g and 0.541 g, respectively, of 4,4'- and 2,4'-isopropylidenediphenol is extracted with supercritical propylene at a constant temperature of 95° C. and a constant pressure of 750 psig. The $C_3H_6$ flow rate is approximately 0.074 g of $C_3H_6$/g initial isomer mixture/min. The following loadings and selectivities are obtained for the first 3 aliquots of $C_3H_6$.

TABLE IV

| Aliquot Number | g $C_3H_6$ | Isomer loadings (mg isomer/g $C_3H_6$) 4,4'- | 2,4'- | Selectivity |
|---|---|---|---|---|
| 1 | 24.7 | 0.201 | 1.18 | 140 |
| 2 | 24.7 | 1.03 | 4.44 | 130 |
| 3 | 24.7 | 0.765 | 2.02 | 91 |

After passing 272 g of $C_3H_6$ through the isomer mixture, a total of 0.139 g and 0.275 g, respectively, of 4,4'- and 2,4'-isomers are extracted by the $C_3H_6$. The initial mixture containing 95.8 percent 4,4'-isomer is separated into an extract containing 33.6 percent 4,4'-isomer and a raffinate containing 97.8 percent 4,4'-isomer. The invention thus selectively separates the 2,4'-isomer from the 4,4'-isomer with supercritical $C_3H_6$.

EXAMPLE 5

A mixture containing 23.207 g and 0.985 g, respectively, of 4,4'- and 2,4'-isopropylidenediphenol is extracted with supercritical propylene. The extraction is carried out by recirculating supercritical $C_3H_6$ through the fixed bed of crushed isomer mixture that is contained in the extraction cell. After leaving the extraction cell, the $C_3H_6$ plus dissolved isomer stream is recycled to the inlet of the extraction cell by means of a recirculation pump. The extraction cell and recirculation pump are maintained at the same temperature, 97° C., and pressure, 850 psig. Initially, the extraction cell and recycle loop are charged with approximately 40 g of $C_3H_6$. After 1.5 hours of recirculation at a rate of approximately 3 g $C_3H_6$ recycled/g initial isomer mixture/min, a small bleed of the gas phase, at a rate of approximately 0.013 g of $C_3H_6$/g initial isomer mixture/min, is initiated from the extraction cell outlet. Neat $C_3H_6$ is added to the extraction cell inlet to maintain a constant pressure at 850 psig, and the gas phase recycle is continued. The $C_3H_6$ plus dissolved isomers in the gas phase bleed are expanded to ambient pressure. This expansion causes the isomers to condense out of the $C_3H_6$ phase. The condensed isomers are separated from the $C_3H_6$ and are collected for analysis. After removal of the isomers, the $C_3H_6$ passes on to a gas meter to determine the quantity of $C_3H_6$ used in the extraction. The following loadings and selectivities are obtained for the first 4 aliquots of $C_3H_6$.

TABLE V

| Aliquot Number | g $C_3H_6$ | Isomer loadings (mg isomer/g $C_3H_6$) 4,4'- | 2,4'- | Selectivity |
|---|---|---|---|---|
| 1 | 4.95 | 1.25 | 4.34 | 102 |
| 2 | 9.90 | 1.53 | 5.27 | 114 |
| 3 | 9.90 | 1.37 | 4.68 | 116 |
| 4 | 9.90 | 1.36 | 4.37 | 115 |

EXAMPLE 6

A mixture containing 1.290 g, 0.128 g and 0.016 g, respectively, of 4,4'-, 2,4'- and 2,2'-methylenedianiline is extracted with supercritical $CO_2$ at a constant temperature of 44° C. and a constant pressure of 1430 psig. The $CO_2$ flow rate is approximately 0.76 g of $CO_2$/g initial isomer mixture/min. The following loadings and selectivities are obtained for the first 7 aliquots of $CO_2$.

TABLE VI

| Aliquot Number | g $CO_2$ | Isomer loadings (mg isomer/g $CO_2$) 4,4'- | 2,4'- | 2,2'- | Selectivity with respect to 4,4'-isomer 2,4'- | 2,2'- |
|---|---|---|---|---|---|---|
| 1 | 31 | 0.167 | 0.065 | 0.0105 | 4.0 | 5.2 |
| 2 | 31 | 0.204 | 0.069 | 0.0107 | 3.5 | 4.4 |
| 3 | 31 | 0.072 | 0.032 | 0.0060 | 4.6 | 7.0 |
| 4 | 31 | 0.201 | 0.093 | 0.0203 | 4.9 | 8.8 |
| 5 | 31 | 0.054 | 0.026 | 0.0062 | 5.1 | 10.2 |
| 6 | 31 | 0.144 | 0.069 | 0.0166 | 5.2 | 10.6 |
| 7 | 31 | 0.150 | 0.076 | 0.0202 | 5.6 | 12.9 |

After passing 248 g of $CO_2$ through the isomer mixture, a total of 0.044 g, 0.021 g and 0.005 g, respectively, of 4,4'-, 2,4'- and 2,2'-isomers are extracted by the $CO_2$. The initial mixture containing 89.9 percent 4,4'-isomer is separated into an extract containing 62.8 percent 4,4'-isomer and a raffinate containing 91.3 percent 4,4'-isomer.

EXAMPLE 7

A mixture containing 0.291 g, 0.027 g and 0.001 g, respectively, of 4,4'-, 2,4'- and 2,2'-methylenedianiline is extracted with supercritical $CO_2$ at a constant temperature of 45° C. and a constant pressure of 1440 psig. The isomer mixture is deposited as a thin layer on 0.3 mm diameter glass spheres. The $CO_2$ flow rate is approximately 2.48 g of $CO_2$/g initial isomer mixture/min. The following loadings and selectivities are obtained for the first 5 aliquots of $CO_2$.

TABLE VII

| Aliquot Number | g $CO_2$ | Isomer loadings (mg isomer/g $CO_2$) 4,4'- | 2,4'- | 2,2'- | Selectivity with respect to 4,4'-isomer 2,4'- | 2,2'- |
|---|---|---|---|---|---|---|
| 1 | 31 | 0.137 | 0.0201 | 0.0014 | 1.6 | 3.1 |
| 2 | 31 | 0.112 | 0.0653 | 0.0062 | 6.8 | 20 |
| 3 | 31 | 0.148 | 0.0849 | 0.0079 | 7.4 | 24 |
| 4 | 31 | 0.098 | 0.0542 | 0.0048 | 7.6 | 37 |
| 5 | 31 | 0.132 | 0.0706 | 0.0059 | 8.1 | 65 |

After passing 186 g of $CO_2$ through the isomer mixture, a total of 0.028 g, 0.013 g and 0.001 g, respectively, of 4,4'-, 2,4'- and 2,2'-isomers are extracted by the $CO_2$. The initial mixture containing 91.2 percent 4,4'-isomer is separated into an extract containing 66.7 percent 4,4'-isomer and a raffinate containing 94.9 percent 4,4'-isomer.

As previously mentioned, the preceding examples serve only to illustrate the invention and its advantages, and they should not be interpreted as limiting since further modifications of the disclosed invention will be apparent to those skilled in the art. All such modifications are deemed to be within the scope of the invention as defined by the following claims.

What is claimed is:

1. A process for separating a mixture of isomers of organic compounds comprising:
   (a) contacting the mixture with a compressed gas under supercritical conditions such that the gas selectively takes up at least one isomer;
   (b) separating the gas, including any of the mixture taken up by the gas in step (a), from the mixture not taken up by the gas in step (a); and
   (c) separating at least part of the mixture taken up by the gas from the gas.

2. The process of claim 1 wherein at least one of the isomers has at least two aromatic rings.

3. The process of claim 2 wherein at least one of the isomers is represented generally by the formula:

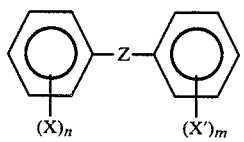

wherein n and m are independently selected from integers of from zero to five inclusive, with the proviso that the quantity (m+n) is greater than zero; Z, which is optional, is S, O, S=O, O=S=O, or a divalent hydrocarbon moiety such as alkylidene, alkenylidene, alkenediyl, arylene, or a moiety which includes at least one fused aromatic ring; and X and X' are independently selected from the group R, —OR, —NRR', halo, —NO$_2$, —SO$_3$R and —COOR, wherein R and R' are independently alkyl, H, aryl or aralkyl.

4. The process of claim 3 wherein at least one isomer of the mixture has X and X' in the 4 and 4' positions of the respective aromatic rings.

5. The process of claim 4 wherein the isomers include 4,4'-isopropylidenediphenol and 2,4'-isopropylidenephenol.

6. The process of claim 4 wherein the isomers include 4,4'-methylenedianiline and at least one of 2,4'-methylenedianiline and 2,2'-methylenedianiline.

7. The process of claim 1 wherein the selectivity is at least about 10.

8. The process of claim 1 wherein the selectivity is at least about 20.

9. The process of claim 3 wherein n=1 and m=1.

10. The process of claim 3 wherein Z is alkylidene.

11. The process of claim 3 wherein X and X' are selected from the group R, —OR, and —NRR'.

12. The process of claim 11 wherein R and R' are H.

13. The process of claim 3 wherein X and X' are identical.

14. A process for separating a mixture, which mixture comprises 4,4'- and 2,4'-isopropylidenediphenol, the process comprising contacting the mixture with a gas under supercritical conditions such that the selectivity is at least about 10.

15. The process of claim 14 wherein the selectivity is at least about 20.

16. A process for separating a mixture which mixture comprises 4,4'-methylene dianiline and at least one of 2,4'- or 2,2'-methylene dianiline, the process comprising:
   (a) contacting the mixture with a compressed gas under supercritical conditions such that the gas selectively takes up at least one isomer;
   (b) separating the gas, including any of the mixture taken up by the gas in step (a), from the mixture not taken up by the gas in step (a); and
   (c) separating at least part of the mixture taken up by the gas from the gas.

17. The process of claim 1 wherein the step (a) is conducted under conditions such that the ratio of the vapor pressures of the desired isomer to the vapor pressures of each unwanted isomer in the mixture is at least about 1.1.

* * * * *

UNITED STATES PATENT AND TRADEMARK OFFICE
CERTIFICATE OF CORRECTION

PATENT NO. : 4,514,574
DATED : April 30, 1985
INVENTOR(S) : Kimio Inoue, Gale G. Hoyer and Stanley I. Bates It is certified that error appears in the above-identified patent and that said Letters Patent is hereby corrected as shown below:

Column 1, line 59, "(G. Brit. No. 1,907,924)" should read -- (CA 1,144,343) --.

Column 2, line 16, "ity" should read -- ely --.

Column 4, line 4, "groups" should read -- group --.

Column 4, line 7, "about" should read -- above --.

Column 12, Claim 5, line 6, "phenol." should read -- diphenol. --.

Signed and Sealed this

Eighth Day of January, 1991

Attest:

*Attesting Officer*

HARRY F. MANBECK, JR.

*Commissioner of Patents and Trademarks*